Feb. 8, 1955 J. C. PETREA 2,701,639

HIGH SPEED CHECK WEIGHER

Filed April 17, 1953 4 Sheets-Sheet 1

INVENTOR.

James C. Petrea

BY

Bacon & Thomas

ATTORNEYS

Feb. 8, 1955 J. C. PETREA 2,701,639
HIGH SPEED CHECK WEIGHER
Filed April 17, 1953 4 Sheets-Sheet 2
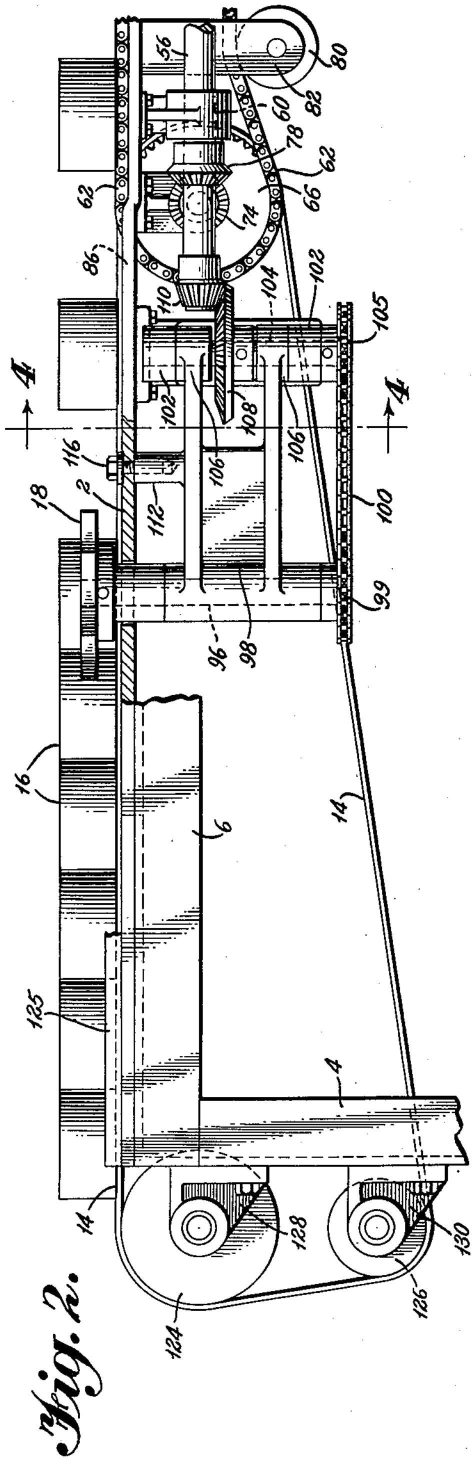
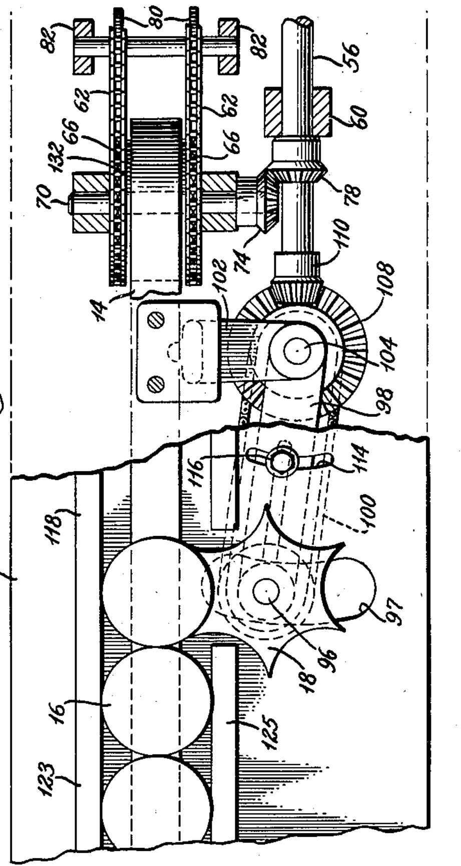
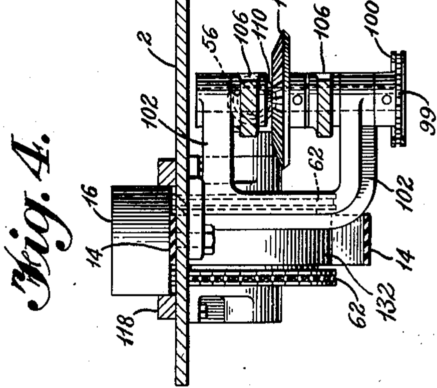
INVENTOR.
James C. Petrea
BY
Bacon & Thomas
ATTORNEYS HIGH SPEED CHECK WEIGHER
Filed April 17, 1953 4 Sheets-Sheet 3
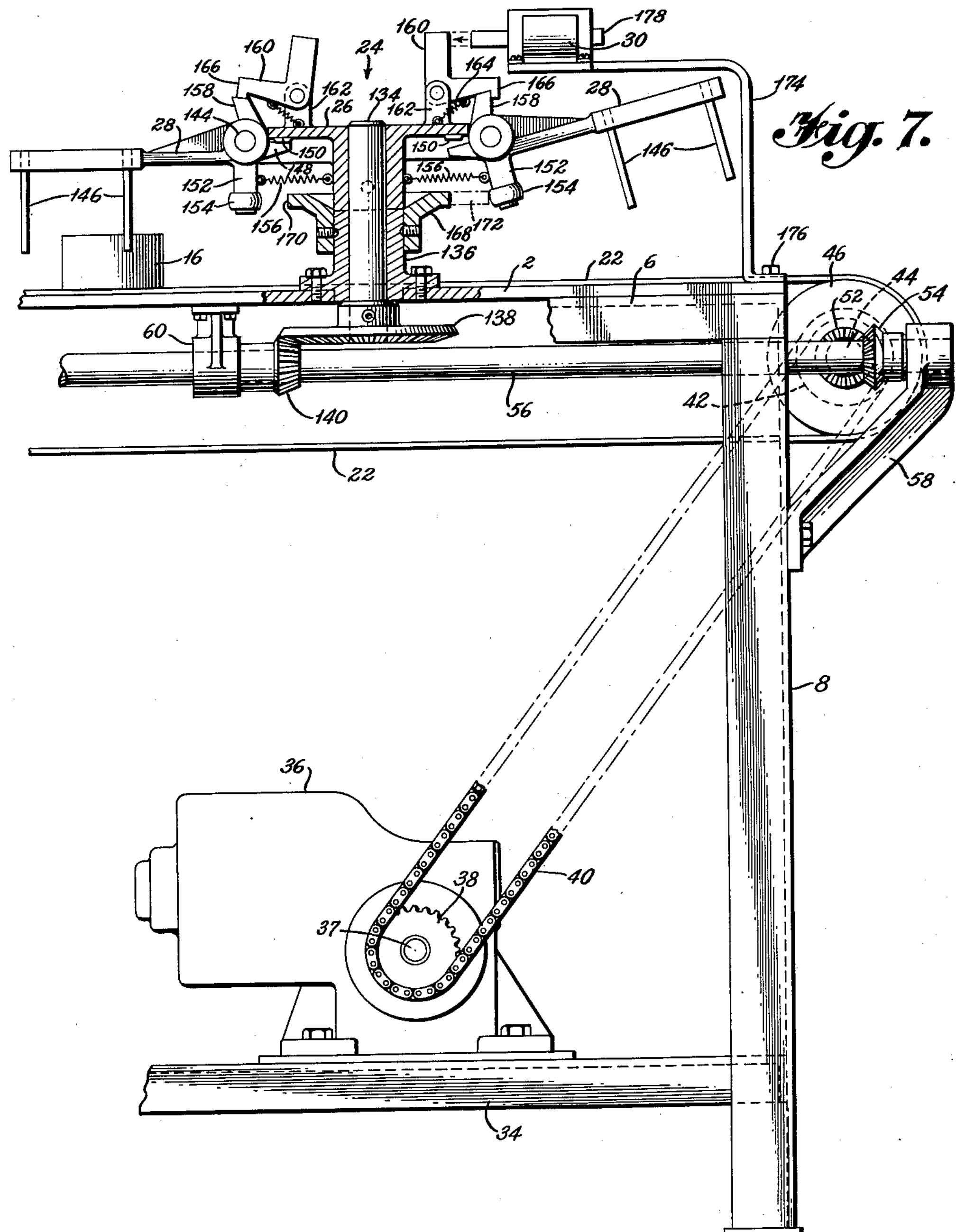
INVENTOR.
James C. Petrea
BY
Bacon & Thomas
ATTORNEYS

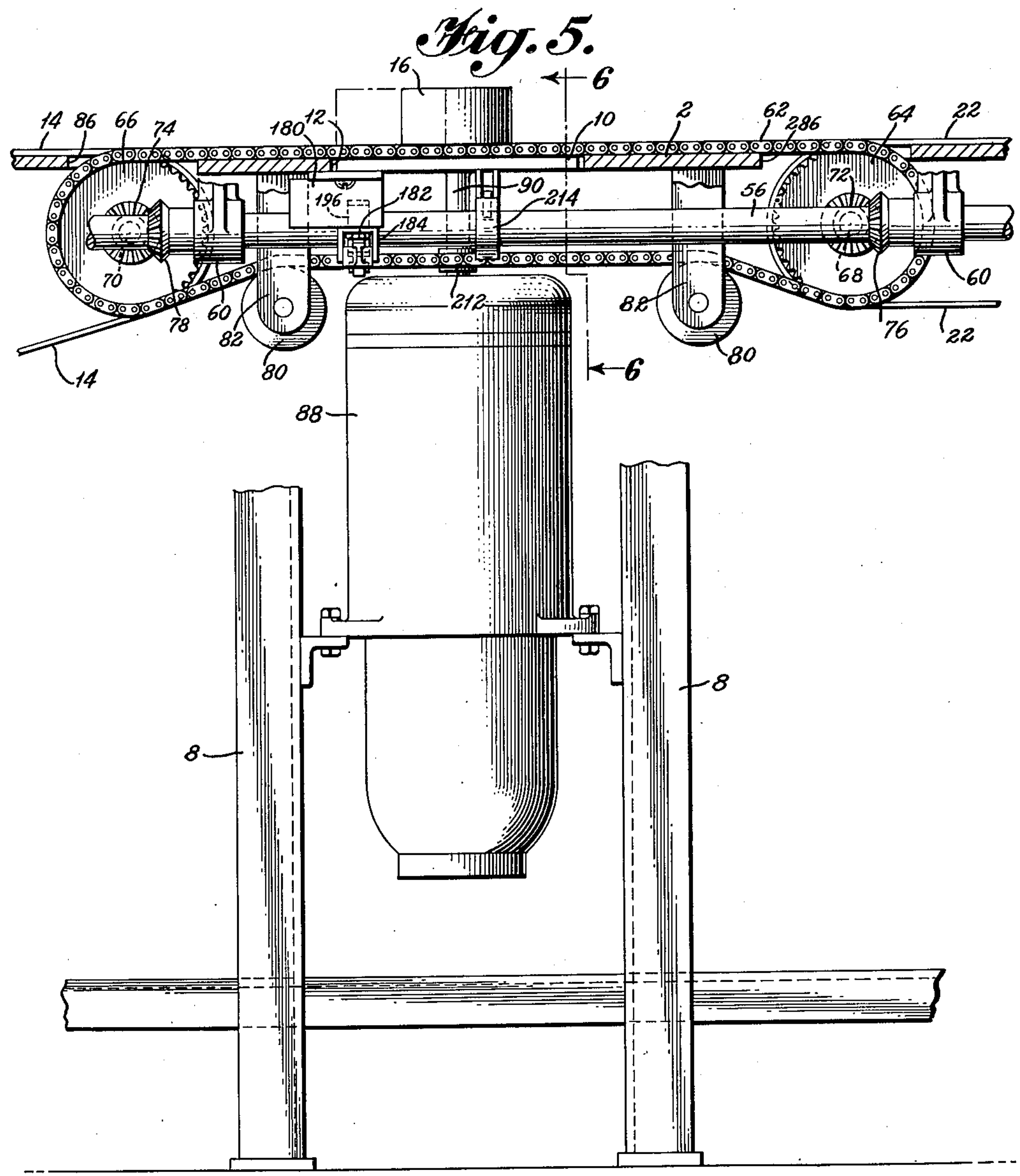
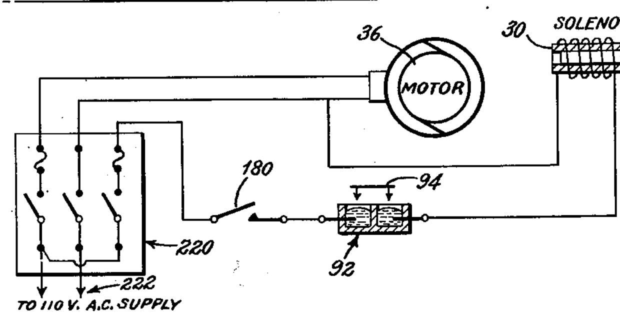
Fig. 8.
INVENTOR.
James C. Petrea
BY
Bacon & Thomas
ATTORNEYS ᠎United States Patent Office 2,701,639

Patented Feb. 8, 1955

2,701,639

HIGH SPEED CHECK WEIGHER

James C. Petrea, Durham, N. C., assignor to Wright Machinery Company, Durham, N. C., a corporation of North Carolina Application April 17, 1953, Serial No. 349,532

16 Claims. (Cl. 209—121)

This invention relates to check weighing apparatus, and more particularly to an apparatus for checking the weight of filled containers to detect and reject offweight packages. The invention relates to such a mechanism wherein offweight packages are separated from those having the required weight and routed for further processing such as adding or removing material to adjust to the desired weight.

In brief, the apparatus consists of an endless conveyor arrangement for continuously conveying articles over a weighing scale. A chain conveyor, so driven as to have uniform and constant slack between sprockets and to "float" free of tautness, is trained over and rests on a weighing platform of a suitable scale device. The scale is released for a weighing cycle in timed relation to movement of the articles thereover so that the scale is in condition to perform a weighing function only during the short interval that an article is passing over and supported by its platform. If the article is offweight, an electrical circuit is closed to condition a rejecting mechanism positioned adjacent the conveyor at a station spaced downstream from the weighing platform. The rejecting mechanism is, in general, a rotary turret having article-engaging arms arranged to sweep over the conveyor and push offweight articles laterally off the conveyor to a rejecting station, which may be a further or take-away conveyor. The arms of the rejecting mechanism normally rotate with the turret at a level above the articles on the conveyor. When the scale device detects an offweight article, a selected arm of the rejecting mechanism is lowered to the level of the articles and the turret is so timed in relation to movement of the conveyor that the lowered arm crosses the conveyor when the offweight article reaches that point of crossing. Means are also provided for holding the weighing platform in a stationary position except during the interval of time when an article is positioned thereon, thus preventing "bobbing" of the scale mechanism. Further means are provided for conditioning an electrical control circuit for the rejecting mechanism so that the circuit can be closed only at a time when an article is on the weighing platform. Movement of the weighing platform past a predetermined position closes a control switch to energize a solenoid arranged to effect lowering of the selected arm of the rejecting mechanism.

It is, therefore, an object of this invention to provide a high speed weighing apparatus in which articles to be weighed are moved continuously, thus contributing to a higher speed of operation.

It is a further object of this invention to provide a weighing apparatus including rejecting mechanism adapted to separate offweight articles from those having the correct weight without intermittent movement of the articles, that is, while the articles are moving continuously through the apparatus.

Another object of this invention is to provide a high speed weighing apparatus with a novel arrangement of conveyor for conveying articles to be weighed over a scale platform.

Still another object of the invention resides in the provision of a structurally novel rejecting mechanism.

It is a general object of this invention to provide a check weighing and rejecting apparatus capable of unusually high speeds of operation whereby it may be used in series with high speed package filling machinery without intermediate storage of the filled packages.

Still another object of this invention resides in the arrangement wherein unusually high speeds of operation are permitted but where the apparatus is simple in construction and economical to produce.

Still further objects and advantages will appear to those skilled in the art as the description proceeds in connection with the accompanying drawings, wherein:

Fig. 2 is a detailed side elevational view, on an enlarged scale, of the left-hand portion of the apparatus of Fig. 1 with certain parts broken away and other parts shown in section;

Fig. 3 is a plan view of the right-hand portion of Fig. 2 with certain elements broken away and others shown in section;

Fig. 4 is a sectional view taken substantially along the line 4—4 of Fig. 2;

Fig. 5 is a view similar to Fig. 2 but showing the central portion of the apparatus of Fig. 1;

Fig. 7 is a side elevational view similar to Figs. 2 and 5 but illustrating the right-hand portion of the apparatus of Fig. 1; and Fig. 8 is a diagrammatic illustration of the electrical circuit employed in the present invention.

Figure 1:
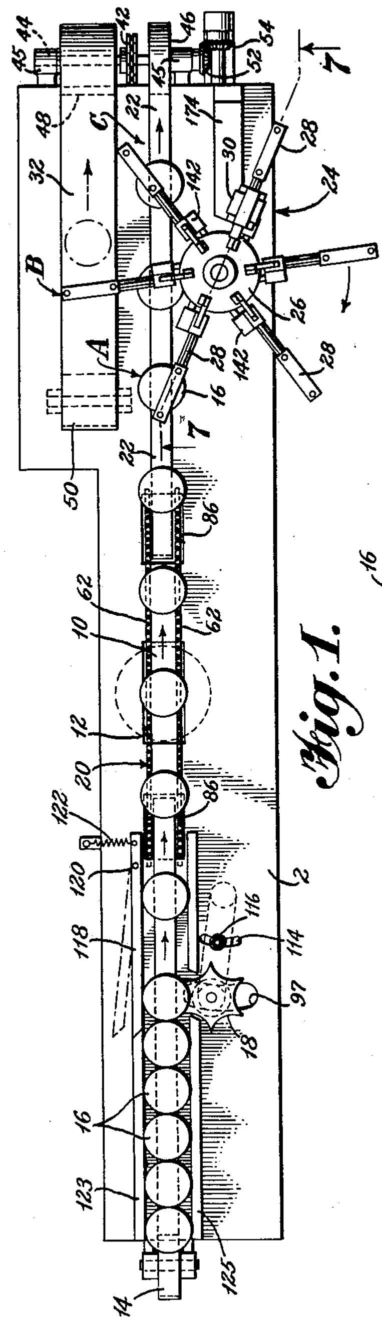
Fig. 1 is a somewhat diagrammatic top plan view of an apparatus embodying the present invention.

Referring first to Fig. 1, the apparatus comprises a top plate or table 2 suitably supported by frame members 4, 6, and 8 (see also Figs. 2, 5, and 7). A weighing platform 10 is positioned in an opening 12 through plate 2 for vertical weighing movement therethrough. Suitable conveyor means 14 feed filled containers 16 to the apparatus, and a star wheel 18, operating in timed relation to the conveyor, acts to space the articles a predetermined distance apart along the conveyor. The conveyor 14 feeds the spaced containers 16 to a second conveyor 20 consisting of spaced parallel chains 62 resting on and guided by the plate 2. Portions of the chains 62 also rest on the weighing platform 10 so that an article being moved by the chains will influence the weighing platform and its associated scale in accordance with the weight of the article. The conveyors 14 and 20 are continuously driven and the weighing platform 10 is sufficiently long so that a container 16 is supported by the weighing platform for a sufficient length of time for the platform and its associated scale to respond to the weight of the filled container and determine whether it has been properly filled or is offweight. From the weighing platform the containers are conveyed to a delivery conveyor 22 and carried past a rejecting mechanism indicated generally at 24 in Figs. 1 and 7. The rejecting mechanism 24 consists principally of a turret 26 and radical arms 28 rotatable therewith. As previously indicated, the arms 28 normally rotate with the turret at such elevation that they pass over containers 16 on the conveyor 22 as long as those containers contain a correct weight of material. If the scale device detects an offweight container, an electrical circuit is closed, energizing a solenoid 30 adjacent the rejecting mechanism and the solenoid 30 is effective to lower the arm 28 adjacent the solenoid at that time. The speed of the conveyors and the speed of rotation of the turret are so related that the arm lowered by the solenoid 30 meets the offweight container at point A and sweeps that container laterally off the conveyor 22 and onto a further or take-away conveyor 32 arranged parallel to and adjacent conveyor 22. Suitable means (not shown) are provided for receiving the properly filled articles delivered by conveyor 22 to the right-hand end of the apparatus and still further means receive the offweight containers transferred to the conveyor 32.

Referring next to Fig. 7, the frame of the apparatus includes a lower portion 34 supporting a driving motor 36 for the machine. The motor 36 may be a conventional geared motor having an output shaft 37 having a sprocket 38 fixed thereon. The sprocket 38 drives a chain 40 extending upwardly to a sprocket 42 (Fig. 1) on a transverse shaft 44 journalled in brackets 45 at the end of the machine. The transverse shaft 44 has fixed thereto pulleys 46 and 48 driving endless conveyor belts 22 and 32, respectively. The conveyor belt 32 is also trained over an idler pulley 50 suitably mounted on the machine frame and projecting upwardly through an opening in plate 2. A miter gear 52 is fixed to one end of transverse shaft 44 and meshes with a second miter gear 54 secured to a drive shaft 56 extending longitudinally of the machine. The shaft 56 may be supported for rotation in bearings carried by brackets 58 and brackets 60.

Referring now to Fig. 5, the conveyor 20 comprises a pair of parallel chains 62 trained over pairs of drive sprockets 64 and 66 (see Fig. 3 also). The pairs of drive sprockets 64 and 66 are respectively spaced from the weighing platform 10 and are fixedly mounted in axially spaced relation on transverse shafts 68 and 70, respectively, suitably journalled in brackets carried by the machine. The shafts 68 and 70 have miter gears 72 and 74, respectively, fixed to corresponding ends thereof and meshing respectively with miter gears 76 and 78 fixed to drive shaft 56. The chains 62, at their lower run, are trained over idler pulleys 80 carried by suitable brackets 82. The weighing platform may be provided with spaced parallel guide rails 84 (see Fig. 6) fixed to its edges and constituting guiding and supporting means for the chains 62. The conveyor chains 62 are so adjusted that a predetermined amount of slack or looseness always exists between the sprockets 64 and 66, and since those sprockets are driven in unison by the shaft 56, the amount of slack in the upper run of chains 62 between sprockets 64 and 66 remains constant and does not influence the effect of a predetermined weight on the weighing platform. There is sufficient slack in the upper run of the chains to permit the required vertical weighing movement of the platform 10 without interference from chain tautness. It is to be noted that the platform 10 supports and weighs a portion of chains 62 along with the filled container 16 thereon. The weight of the length of chain supported by the platform 10 is constant so the only variable to be detected by the scale device is the weight of a container 16 and its contents. The sprockets 64 and 66 extend through openings 86 in the plate 2 whereby the upper run of chains 62 may extend across and rest on the upper surface of said plate 2. That portion of each of the chains 62 between the weighing platform 10 and the sprockets 64 and 66 is supported by the plate 2 and thus has no influence on the weighing platform. As can be readily seen in Fig. 1, the spacing between containers 16 is such that a plurality of such containers are simultaneously supported and being moved by the conveyor chains 62 and between the sprockets 64 and 66. Those containers between the weighing platform and either of the sprocket pairs is supported by the plane 2 of the machine and, therefore, only the container directly over the platform 10 has any effect on the weighing device.

Figure 6:
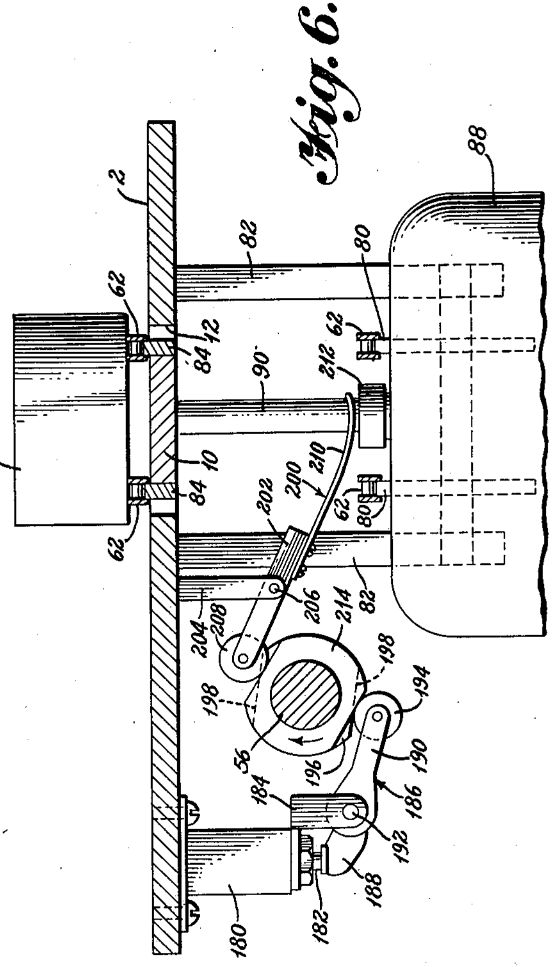
Fig. 6 is a sectional view taken substantially along the line 6—6 of Fig. 5.

The weighing device shown in Figs. 5 and 6 may be of a well-known float type such as shown and described in Patent No. 2,522,767, consisting generally of an outer liquid-tight casing 88 at least partially filled with a suitable liquid. A float member (not shown) is guided within the casing 88 for vertical movement and is partially submerged in the liquid therein. The float is connected to an upwardly extending stem 90, to the upper end of which the weighing platform 10 is secured. The scale device is of a well-known type and it will be obvious that a change in the weight supported by platform 10 will result in greater or lesser submersion of the float resulting from vertical movement of the platform 10.

The idler pulleys 80, over which the lower runs of chains 62 are trained, are so positioned that the portion of the chain therebetween extends across the top and clear of casing 88.

A suitable switch device is operated by a predetermined relative movement between the stem 90 and casing 88 to close a circuit. The switch referred to is identified by numeral 92 in Fig. 8. The switch 92 may consist of separated pools of mercury adapted to be electrically connected by a movable bridge member 94. The bridge member is arranged to be moved vertically by movement of the stem 90 in such a way that upward movement of the stem 90 and weighing platform 10 results in downward movement of the bridge member 94 when the device is set for detecting underweight articles. However, the apparatus may be arranged to detect overweight articles rather than underweight by so connecting the bridge member 94 to stem 90 that it moves in the same direction. Under such conditions the switch 92 will be closed only by movement of the weighing scale to a position indicating overweight.

Referring now to Figs. 1, 2, 3, and 4, the star wheel 18 is fixed to the upper end of a shaft 96 extending through an arcuate slot 97 through plate 2 and journalled in one end of a swinging arm 98 below plate 2. The lower end of shaft 96 has a sprocket 99 fixed thereto over which a chain 100 is trained. The arm 98 is swingably mounted between arms of a bifurcated bracket 102 by means of a pair of spaced bearings portions 106. The portions 106 are rotatable about a shaft 104 which is, in turn, journalled in the arms of bracket 102. A bevel gear 108 is fixed to the shaft 104 between the portions 106 of arm 98. The lowermost end of shaft 104 carries a drive sprocket 105 over which chain 100 is trained, thus drivingly connecting shafts 96 and 104. The bevel gear 108 meshes with a bevel pinion 110 fixed to the left end of drive shaft 56. A boss 112 extends upwardly from about the mid-portion of arm 98 to an elevation just below the bottom surface of plate 2. The boss 112 is provided with a vertical threaded bore extending downwardly from the top end thereof. The plate 2 is provided with an arcuate slot 114 directly over boss 112 and a cap screw or the like 116 bears against the upper surface of plate 2 with its threaded portion extending through the slot 114 and threadedly engaging the bore in boss 112. By this structure it will be apparent that the star wheel 18 may be laterally adjusted with respect to the conveyor 14 to accommodate containers of different size. While the star wheel 18 is shown as shaped to engage and space round containers, it will be apparent that the star wheel may be so shaped as to engage and control the spacing of containers of other configurations.

A safety bar 118 is pivoted as at 120, to the upper surface of plate 2 on the opposite side of conveyor 14 from the star wheel 18. A spring 122 urges the safety bar 118 in a counterclockwise direction as viewed in Fig. 1, to insure proper engagement of the containers 16 with the star wheel 18. Fixed guide fences 123 and 125 may also be provided to confine containers which may "pile up" ahead of the star wheel 18.

The conveyor 14 consists of an endless belt trained over idler pulleys 124 and 126 journalled in brackets 128 and 130, respectively, at the left end of the machine. The conveyor belt 14 is also trained over a drive pulley 132 (see Fig. 3) positioned between the sprockets 66 and fixed on shaft 70. The diameter of the pulley 132 is so chosen in relation to the diameter of sprockets 66 that the linear speed of the conveyor belt 14 is substantially the same as the linear speed of the conveyor chains 62. It will thus be seen that the same shaft, 56, positively drives the conveyors 14 and 62 at a predetermined speed and also drives the star wheel 18 in timed relation to those conveyors whereby the containers 16, being fed to the machine by conveyor 14, are spaced apart a predetermined distance in the direction of movement of the conveyors before being carried over the weighing platform 10 and to the rejecting mechanism. From the time the containers are spaced by the star wheel 18 until the time they pass the rejecting mechanism they do not engage any parts of the machine other than the conveyors which are moving at uniform speed. Thus, there is no influence tending to disturb the spacing of the containers as determined by the star wheel 18.

The rejecting mechanism of Figs. 1 and 7 comprises a rotary turret 26 fixed to a shaft 134 journalled about a vertical axis in a bracket 136 fixed to the plate 2. The shaft 134 extends downwardly through bracket 136 and plate 2 and has a bevel gear 138 fixed to its lower end. The bevel gear 138 meshes with a bevel pinion 140 fixed to the drive shaft 56. Thus, the turret 26 is driven in timed relation to the movement of the conveyors carrying filled containers through the apparatus.

The turret 26 has a plurality of brackets 142 (see Fig. 1) fixed thereon in circumferentially spaced relation. Each of the arms 28, previously referred to, is pivoted to one of the brackets 142 by means of a pin or shaft 144 (Fig. 7) having its axis extending generally horizontally and generally tangential to the axis of shaft 134. The arms 28 extend outwardly from their pivotal connection to the turret 26 and may carry downwardly projecting rods 146 arranged to engage a container 16 on conveyor 22 when an arm 28 is in the lowered position shown at the left of Fig. 7. Each of the arms 28 carries an inwardly directed extension 148 engageable with a portion 150 of the underside of turret 26 to limit downward pivotal movement of the arms 28. Each of the arms 28 also has a downwardly projecting finger 152 having a roller 154 journalled to its lower end. A tension spring 156 connects each of the fingers 152 to the turret 26 to thus urge each of the arms 28 to its lowered position. Each of the arms 28 also carries an upwardly extending projection 158 adapted to be engaged and held by a pivoted latch 160 pivotally mounted on a bracket 162 carried by turret 26. The turret 26 is provided with a bracket 152 and a latch 160 for each of the arms 28. A tension spring 164 urges each of the latches in a direction to engage its hooked end 166 over the extension 158 of its associated arm 28 to hold the arm in its upper position as shown at the right side of Fig. 7.

The bracket 136 in which shaft 134 is journalled also supports a cam member 168 having a peripheral cam edge 170 at a level corresponding to the level of the rollers 154 journalled on fingers 152. The periphery 170 of cam 168 is provided with a projection or lobe (indicated at 172 by dotted line) arranged to engage the roller 154 of an arm 28 when the latter is in its lowered position to thereby swing the arm upwardly to its raised position and to engage its latch 160 to hold the arm in such elevated position. Fig. 7 shows the cam lobe 172 but in actual practice it would not be positioned in the location shown but on the remote side of the plane of the figure.

As previously stated, an arm 28 in the lowered position as shown at the left of Fig. 7 positions the rods 146 at such elevation that they engage a container 16 on the conveyor 22 and in rotating about the axis of shaft 134 the arm will thus sweep the container so engaged laterally off the conveyor 22 and onto conveyor 32, as clearly evident from Fig. 1. An arm in the upper position as indicated at the right of Fig. 7 is so elevated that the rods 146 will not engage a container 16 on conveyor 22 but will pass thereover without moving that container from the conveyor 22.

The solenoid 30, previously referred to, is mounted on a stationary bracket 174 fixed, as at 176, to the frame of the machine. The bracket 174 holds solenoid 30 in a fixed position adjacent the path of movement of upwardly extending portions of latches 160. The solenoid 30 is provided with a movable armature 178 urged radially inwardly of the turret 26 when the solenoid is energized. Means to be described cause energization of the solenoid 30 only at times when a latch 160 is directly inwardly therefrom so that energization of the solenoid causes inward movement of its armature 178 sufficient to engage the upwardly extending portion of the adjacent latch 160 and swing that latch to a position where it disengages projection 150 of associated arm 28, thus releasing that arm for movement under the influence of gravity and its spring 156 to its lowered position.

The electrical circuit for energizing solenoid 30 is the switch 92 previously referred to, controlled by the position of stem 90 which supports weighing platform 10. As previously described, the conveyor chains 62, conveyor 22, and turret 26 are all driven by the shaft 56 in timed relation to each other. Thus, a position may be selected for the solenoid 30 such that an offweight container on platform 10 will cause lowering of the arm 28 then at that position which is so located that the lowered arm will rotate with the turret 26 and meet that offweight container at the point A indicated in Fig. 1 to thereby sweep that container from the conveyor 22 in the manner described. The lowered arm 28 sweeps the offweight container onto conveyor 32 and the cam lobe 172 is so positioned that the lowered arm 28 is raised to its elevated position at about the time it reaches the position indicated by B in Fig. 1. Thus, the rejected container is released to the conveyor 32 and the arm 28 is raised to its upper position before it again crosses conveyor 22 in its approach to the solenoid 30. It is preferred that the arm 28 be raised before returning across conveyor 22 to thereby prevent the rods 146 from inadvertently sweeping properly filled containers off the conveyor 22 at the position indicated by C in Fig. 1.

As stated previously, the solenoid 30 is energized by closing of switch 92 in response to movement of weighing platform 10 past a certain predetermined position representing the acceptable weight of a container and its contents. The circuit for energizing solenoid 30 is indicated in Fig. 8, and switch 92 and its associated bridge member 94 are schematically shown therein. As is clearly evident from Fig. 8, the mere closing of switch 92 in and of itself is not sufficient to close the circuit to solenoid 30, it being also necessary that switch 180 be closed simultaneously with the closing of switch 92. The switch 180 may be a quick acting switch of the type commonly referred to as a "Microswitch," having an actuating plunger 182 (Fig. 6). The switch 180 is mounted on stationary plate 2 and carries a bracket 184 to which a lever 186 is pivoted. The lever 186 is provided with one arm 188 arranged to engage the plunger 182 and an arm 190 on the opposite side of its pivot 192 carrying a cam following roller 194 at its free end. The roller 194 engages a cam 196 fixed to drive shaft 56. As clearly shown in Fig. 6, the cam 196 is principally a circular structure but is provided with a pair of diametrically opposed flats or depressions 198 which, when opposite roller 194, cause closing of switch 180 to thereby condition the solenoid circuit for energization if switch 92 is also closed. It will be evident that a single rotation of shaft 56 causes conditioning of the solenoid circuit twice since a single rotation of shaft 56 also causes two containers 16 to be moved across weighing platform 10. The cam 196 is so angularly positioned on shaft 56 that switch 180 is closed during the interval of time when a container 16 is actually in position to be weighed on platform 10.

Since the weighing apparatus of the present invention is intended to be operated at relatively high speeds, there is danger that the weighing platform 10 will continually oscillate due to the rapid positioning and removal of filled containers thereon. The natural period of oscillation of the weighing mechanism would thus destroy the sensitivity of its weighing function and would result in many erroneous indications. To prevent such unwanted oscillations and to provide for a minimum of movement of platform 10, a hold-down device 200 is provided. The device 200 consists of a lever 202 pivoted on a bracket 204 carried by the plate 2. The lever 202 carries, on one side of its pivot 206, a cam following roller 208 and the other end of the lever is provided with a finger 210 arranged to engage a portion of the stem 90, for instance, a collar 212 carried thereby. A second cam 214, identical in construction to the cam 196, is fixedly mounted on the shaft 56 in position to engage the roller 208 on lever 202. The parts are so related and proportioned that the portion 210 of the hold-down device engages collar 212 and holds the weighing platform 10 and its flat in a fixed lower position during those intervals of operation when no container is on the platform 10. The timing is such that as soon as a filled container is moved onto platform 10 the cam 214 acts to release collar 212 and its associated stem 90, weighing platform 10, and the float described. Preferably, the hold-down device 200 acts to hold the platform 10 at an elevation just slightly below that point representing the minimum acceptable weight of a container 16 and its contents. Thus, if the container and its contents are at least equal to the minimum required weight, release of the hold-down device 200 will not result in upward movement of the platform 10 to any appreciable degree and switch 92 will not be closed. However, if the container 16 and its contents then on the platform are less than the required minimum weight, the platform and rod 90 may move upwardly sufficiently to close switch 92 and thereby energize solenoid 30 and condition the proper arm 28 for subsequent removal of the underweight container from the conveyor 22. Immediately after the solenoid is energized, rotation of shaft 56 and cam 214 will again actuate the hold-down device 200 to return the platform to its stationary position, thus preventing unwanted oscillations or "bobbing" of the platform and permitting an unusually high speed of operation. In the event an overweight article moves onto the weighing platform, the hold-down device 200 will be ineffective to prevent immediate movement of the stem 90 but will be repositioned in its hold-down position immediately after the overweight article has left the platform and thus prevent the weighing mechanism from "bobbing" above the hold-down position.

A main control switch 220, which may be manually operated, may also be provided for placing the apparatus in operation by closing a circuit supplying motor 36 with electrical energy from a suitable power line 222. The control switch 220 also conditions the circuit for solenoid 30 whereby to supply current thereto when switches 92 and 180 are closed.

While a single specific embodiment of the invention is shown and described herein, it is to be understood that many other modifications may be resorted to within the scope of the invention as defined by the appended claims.

I claim:

1. In a weighing apparatus, means for continuously conveying articles to be weighed along a substantially rectilinear path, means defining a weighing station at a fixed position along said path, a reject mechanism rotatably mounted adjacent said path but spaced therealong from said weighing station, said reject mechanism including a plurality of article rejecting members sequentially movable transversely across said path, means responsive to said means at said weighing station for conditioning one of said rejecting members to engage an offweight article and move the same laterally of said path, and means for driving said conveying means and said reject mechanism in timed relation.

2. In a weighing apparatus, means for conveying articles to be weighed along a predetermined path, means defining a weighing station at a fixed position along said path, a reject mechanism mounted adjacent said path but spaced therealong from said weighing station, said reject mechanism including a plurality of article-rejecting members thereon and means sequentially moving said rejecting members transversely across said path, means responsive to said means at said weighing station for conditioning one of said rejecting members to engage an offweight article and move the same laterally of said path, and means for driving said conveying means and said reject mechanism in timed relation.

3. A weighing apparatus as defined in claim 2, wherein said rejecting members normally move across said path above articles being moved therealong, said conditioning means being operable to lower the selected rejecting member to the level of the offweight article to be rejected.

4. A weighing apparatus as defined in claim 2, including further means for raising said rejecting member to its normal height after movement of said offweight article a predetermined distance laterally of said path.

5. In a weighing apparatus, conveying means for continuously moving a line of spaced articles to be weighed across a weighing platform, rejecting mechanism for removing offweight articles from said line, control means for said rejecting mechanism, said control means being responsive to movement of said weighing platform beyond a predetermined position, mechanism holding said weighing platform stationary substantially at said predetermined position, means for withdrawing said holding mechanism and releasing said weighing platform, said last named means being operated in timed relation to said article moving means whereby to release said weighing platform only when an article to be weighed is positioned thereon, said control means for said rejecting mechanism including an electrically operated device, an electrical control circuit for said device, a first switch in said circuit arranged to be closed by movement of said weighing platform beyond said predetermined position, a second switch in said circuit arranged in series with said first switch, and means for closing said second switch in timed relation to said article moving means so as to condition said circuit for closing by said first switch only when an article to be weighed is in position on said weighing platform.

6. A weighing apparatus as defined in claim 5, wherein said means for moving said articles comprises a continuously driven conveyor, spacing means for spacing said articles a predetermined distance apart along said conveyor, a common drive shaft for said conveyor and spacing means, and cam means on said shaft arranged to actuate said second switch in the manner set forth.

7. In a weighing apparatus, a weighing platform, a conveyor comprising spaced parallel endless chains, a substantially horizontal run of said conveyor being trained over and resting on said weighing platform, drive means for said conveyor comprising driving sprockets engaging each of said chains on each side of said platform, and common drive means arranged to drive all said sprockets in unison whereby to maintain a predetermined amount of slack in said chains between said sprockets.

8. A weighing apparatus as defined in claim 7, wherein said sprockets are spaced from said platform in the direction of movement of said chains, and fixed means between said sprockets and said platform arranged to support and guide those portions of said chains between said sprockets and platform.

9. In a weighing apparatus, a weighing platform, a conveyor comprising spaced parallel endless chains, a substantially horizontal run of said conveyor being trained over and resting on said weighing platform, drive means for said conveyor comprising driving sprockets engaging each of said chains on each side of said platform, and common drive means arranged to drive all said sprockets in unison whereby to maintain a predetermined amount of slack in said chains between said sprockets, the sprockets on each side of said platform being fixedly mounted, in axially spaced relation, on a common drive shaft, a pulley fixed to said shaft between said sprockets, and an endless belt trained over said pulley and constituting a continuation of said conveyor.

10. In a weighing apparatus, an article advancing and weighing mechanism arranged to sequentially weigh said articles, a first conveyor having a substantially rectilinear run arranged to receive spaced weighed articles from said mechanism, a second conveyor having a run adjacent and parallel to said first conveyor, means for driving said conveyors, a rejecting mechanism comprising a structure mounted for rotation about an axis substantially normal to the plane defined by said runs, circumferentially spaced elements carried by said structure, the arrangement being such that rotation of said structure about its axis causes said elements, during a portion of their movement, to sweep generally laterally across said first conveyor to a position overlying said second conveyor, means for driving said rotary structure in timed relation to the movement of said first conveyor, and means responsive to said weighing mechanism to condition a selected one of said elements to engage and sweep an offweight article from said first conveyor to said second conveyor.

11. In a weighing apparatus having means for sequentially weighing articles and a conveyor for said weighed articles; a rejecting mechanism comprising, a rotary turret adjacent said conveyor, circumferentially spaced elements on said turret, the arrangement being such that rotation of said turret causes said elements to sweep laterally across said conveyor, means mounting each of said elements for movement on said turret to position a portion of said element in a first position wherein it intersects the path of articles on said conveyor or in a second position wherein it moves across said conveyor clear of the path of articles thereon, holding means normally holding said elements in said second position, and means responsive to said weighing means to cause said elements to move to said first position.

12. An apparatus as defined in claim 11, wherein said elements comprise arms pivoted to said turret for generally vertical swinging movement thereon, said holding means comprising latches on said turret engageable with portions of said arms when said arms are in said second position.

13. An apparatus as defined in claim 12, including a stationary cam arranged to engage portions of arms in said first position and move said arms to said second position, said cam being arranged to move an arm to said second position after said arm engages an article on said conveyor and sweeps said article laterally therefrom to a reject position.

14. An apparatus as defined in claim 12, wherein said means responsive to said weighing means includes a fixed solenoid arranged adjacent the path of movement of said latches to release the latch adjacent said solenoid when the latter is energized.

15. In a weighing apparatus having means for sequentially weighing articles and a generally horizontal conveyor for said weighed articles; a rejecting mechanism comprising, a turret mounted for rotation about a vertical axis laterally adjacent said conveyor, circumferentially spaced generally radial arms pivoted to said turret on horizontal axes at the inner ends of and normal to said arms, means arranged to cause said arms to swing in a downward direction to a first predetermined position, a latch for each arm, said latches being carried by said turret and engageable with their respective arms, when the latter are swung upwardly to a second predetermined position, to hold said arms in said second position, a stationary solenoid responsive to said weighing means and mounted adjacent the path of movement of said latches, said solenoid being arranged to release the latch adjacent said solenoid when the latter is energized, and a stationary cam positioned in the path of movement of an arm in said first position to raise that arm to said second position.

16. A weighing apparatus as defined in claim 15, wherein outer portions of said arms sweep generally laterally over said conveyor to a remote position spaced outwardly from the side of said conveyor opposite said vertical axis, said solenoid being positioned to lower a selected arm before said arm crosses said conveyor when moving toward said remote position, and said cam being arranged to raise said arm while it is adjacent said remote position and before it again crosses said conveyor.

References Cited in the file of this patent

UNITED STATES PATENTS

| | | |
|---|---|---|
| 742,433 | Hopkins | Oct. 27, 1903 |
| 1,220,922 | Winnigham | Mar. 27, 1917 |
| 2,235,725 | Nordquist | Mar. 18, 1941 |
| 2,307,695 | Mansbendel | Jan. 5, 1943 |